United States Patent
Gong et al.

(10) Patent No.: US 11,385,349 B2
(45) Date of Patent: Jul. 12, 2022

(54) DELAY-ENCODED HARMONIC IMAGING WITH AN ULTRASOUND SYSTEM

(71) Applicant: Mayo Foundation for Medical Education and Research, Rochester, MN (US)

(72) Inventors: Ping Gong, Rochester, MN (US); Pengfei Song, Rochester, MN (US); Shigao Chen, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 631 days.

(21) Appl. No.: 16/343,304

(22) PCT Filed: Oct. 19, 2017

(86) PCT No.: PCT/US2017/057304
§ 371 (c)(1),
(2) Date: Apr. 18, 2019

(87) PCT Pub. No.: WO2018/075721
PCT Pub. Date: Apr. 26, 2018

(65) Prior Publication Data
US 2020/0183004 A1    Jun. 11, 2020

Related U.S. Application Data
(60) Provisional application No. 62/410,998, filed on Oct. 21, 2016.

(51) Int. Cl.
*G01S 15/89* (2006.01)
*G01S 7/52* (2006.01)
*G06F 17/16* (2006.01)

(52) U.S. Cl.
CPC ...... *G01S 15/8963* (2013.01); *G01S 7/52022* (2013.01); *G01S 7/52028* (2013.01);
(Continued)

(58) Field of Classification Search
CPC ............ G01S 15/8963; G01S 7/52022; G01S 7/52028; G01S 7/52093; G01S 15/8977;
(Continued)

(56) References Cited

U.S. PATENT DOCUMENTS 5,720,708 A    2/1998 Lu
5,851,187 A    12/1998 Thomas
(Continued)

FOREIGN PATENT DOCUMENTS

CN    110785126 A  *  2/2020   ............ A61B 8/5223
CN    110998361 A  *  4/2020   ......... G01S 15/8963
(Continued)

OTHER PUBLICATIONS

Correia M., et al, "Ultrafast Harmonic Coherent Compound (UHCC) Imaging for High Frame Rate Echocardiography and Shear-Wave Elastography," IEEE Transactions on Ultrasonics Ferroelectrics and Frequency Control, vol. 63, pp. 420-431, Mar. 2016.
(Continued)

*Primary Examiner* — Daniel Pihulic
(74) *Attorney, Agent, or Firm* — Quarles & Brady LLP

(57) ABSTRACT

Systems and methods for ultrasound imaging using a delay-encoded harmonic imaging ("DE-HI") technique is provided. An ultrasound pulse sequence is coded using temporal delays between ultrasound emissions within a single transmission event. This coded scheme allows for harmonic imaging to be implemented. The temporal time delay-codes are applied temporally to multiple different ultrasound emissions within a single transmission event, rather than spatially across different transmitting elements. The received radio
(Continued)

frequency ("RF") signals undergo a decoding process in the frequency domain to recover the signals, as they would be obtained from standard single emissions, for subsequent compounding. As one specific example, a one-quarter period time delay can be used to encode second harmonic signals from each angle emission during a single multiplane wave ("MW") transmission event, rather than inverting the polarity of the pulses as in conventional MW imaging.

20 Claims, 6 Drawing Sheets

(52) U.S. Cl.
CPC ...... *G01S 7/52093* (2013.01); *G01S 15/8977* (2013.01); *G06F 17/16* (2013.01)

(58) Field of Classification Search
CPC ............... G01S 7/52038; G01S 7/5202; G01S 7/52077; G01S 15/8915; G01S 15/8959; G01S 15/8995; G06F 17/16
See application file for complete search history.

(56) References Cited

U.S. PATENT DOCUMENTS

| | | | |
|---|---|---|---|
| 6,048,315 A | 4/2000 | Chiao | |
| 6,050,947 A | 4/2000 | Rhyne | |
| 2019/0261948 A1* | 8/2019 | Gong | A61B 8/488 |
| 2020/0146656 A1* | 5/2020 | Gong | G01S 15/8915 |
| 2020/0183004 A1* | 6/2020 | Gong | G01S 7/52093 |
| 2021/0085293 A1* | 3/2021 | Gong | G01S 15/8915 |

FOREIGN PATENT DOCUMENTS

| | | | | |
|---|---|---|---|---|
| EP | 3641658 A1 * | 4/2020 | ......... | G01N 29/4472 |
| EP | 3658951 A1 * | 6/2020 | ......... | G01S 7/52039 |
| JP | 2000166920 A * | 6/2000 | | |
| WO | 2016161009 | 10/2016 | | |
| WO | WO-2018053084 A1 * | 3/2018 | ......... | G01S 7/52047 |
| WO | WO-2018075721 A1 * | 4/2018 | ......... | G01S 7/52077 |
| WO | WO-2018237244 A1 * | 12/2018 | ............. | G01N 29/46 |
| WO | WO-2019023422 A1 * | 1/2019 | ......... | G01S 15/8997 |
| WO | WO-2020142760 A1 * | 7/2020 | ............... | A61B 8/48 |

OTHER PUBLICATIONS

Couade, M. "The advent of ultrafast ultrasound in vascular imaging: a review." May 2, 2016. Journal of Vascular Diagnostics and Interventions. p. 13.
Gong P., et al, "Delay-Encoded Transmission and Image Reconstruction Method in Synthetic Transmit Aperture Imaging," IEEE Transactions on Ultrasonics Ferroelectrics and Frequency Control, vol. 62, pp. 1745-1756, Oct. 2015.
Gong P., et al, "Delay-encoded transmission in synthetic transmit aperture (DE-STA) imaging," in Ultrasonics Symposium (IUS), 2014 IEEE International, 2014, p. 1005.
Gong P., et al, "Pseudo-Inverse (PI) Decoding process in Delay-encoded Synthetic Transmit Aperture (DE-STA) Imaging," IEEE Transactions on Ultrasonics, Ferroelectrics, and Frequency Control, vol. PP, pp. 1-1, 2016.
Hansen, J J. M., et al, "Compounding in Synthetic Aperture Imaging," IEEE Transactions on Ultrasonics Ferroelectrics and Frequency Control, vol. 59, pp. 2054-2065, Sep. 2012.
Hemmsen M.C., et al, "Tissue harmonic synthetic aperture ultrasound imaging," Journal of the Acoustical Society of America, vol. 136, pp. 2050-2056, Oct. 2014.
Insana M. F., et al, "Visual detection efficiency in ultrasonic imaging: A framework for objective assessment of image quality," The Journal of the Acoustical Society of America, vol. 95, pp. 2081-2090, 1994.
International Searching Authority, International Search Report and Written Opinion for application PCT/US2017/057304, dated Jan. 4, 2018, 16 pages.
Jensen J. A., et al, "Synthetic aperture ultrasound imaging," Ultrasonics, vol. 44, Supplement, p. e5, Dec. 22, 2006.
Ma Q. Y., et al, "Improvement of tissue harmonic imaging using the pulse-inversion technique," Ultrasound in Medicine and Biology, vol. 31, pp. 889-894, Jul. 2005.
Montaldo G., et al, "Coherent plane-wave compounding for very high frame rate ultrasonography and transient elastography," IEEE transactions on ultrasonics, ferroelectrics, and frequency control, vol. 56, p. 489, Mar. 2009.
Sanchez, J. R., et al, "An ultrasonic imaging specklesuppression and contrast-enhancement technique by means of frequency compounding and coded excitation," IEEE Trans Ultrason Ferroelectr Freq Control, vol. 56, pp. 1327-1339, Jul. 2009.
Smith S. W., et al, "Low Contrast Detectability and Contrast Detail Analysis in Medical Ultrasound," Ultrasonic Imaging, vol. 4, pp. 188-188, 1982.
Song P., et al, "Coded Excitation Plane Wave Imaging for Shear Wave Motion Detection," IEEE Transactions on Ultrasonics Ferroelectrics and Frequency Control, vol. 62, pp. 1356-1372, Jul. 2015.
Song P., et al, "Improved Shear Wave Motion Detection Using Pulse-Inversion Harmonic Imaging With a Phased Array Transducer," IEEE Transactions on Medical Imaging, vol. 32, pp. 2299-2310, Dec. 2013.
Tanter M. et al, "Ultrafast Imaging in Biomedical Ultrasound," IEEE Transactions on Ultrasonics Ferroelectrics and Frequency Control, vol. 61, pp. 102-119, Jan. 2014.
Tiran E., et al., "Multiplane wave imaging increases signal-to-noise ratio in ultrafast ultrasound imaging," Physics in Medicine and Biology, vol. 60, pp. 8549-8566, Nov. 2015.
Tranquart F. et al, "Clinical use of ultrasound tissue harmonic imaging," Ultrasound in Medicine and Biology, vol. 25, pp. 889-894, Jul. 1999.
Üstüner K.F. et al, "Ultrasound Imaging System Performance Assessment," Siemens Medical Solutions USA, Inc 2003.
Whittingham A. T. , "Tissue harmonic imaging," European Radiology, vol. 9, pp. S323-S326, 1999.

* cited by examiner

DELAY-ENCODED HARMONIC IMAGING WITH AN ULTRASOUND SYSTEM

CROSS-REFERENCE TO RELATED APPLICATIONS

This application is a 371 U.S. National Phase Entry application of PCT/US17/57304, filed on Oct. 19, 2017, which claims the benefit of U.S. Provisional Patent Application Ser. No. 62/410,998, filed on Oct. 21, 2016, and entitled "DELAY-ENCODED HARMONIC IMAGING WITH AN ULTRASOUND SYSTEM," each of which is herein incorporated by reference in its entirety.

BACKGROUND OF THE DISCLOSURE

The development of ultrafast ultrasound imaging techniques offers great opportunities to new imaging technologies, such as shear wave elastography, ultrafast Doppler imaging, and diverging wave compounding. In compounded ultrafast imaging, high frame rate B-mode images are acquired by coherently combining several plane (or diverging) wave emissions with different tilted angles. The frame rate is significantly improved compared to conventional line-by-line focused B-mode imaging; however, the high frame rate is usually achieved by sacrificing other quality metrics such as image signal-to-noise ratio ("SNR") and spatial resolution.

Because of these trade-offs, ultrafast ultrasound imaging techniques generally face several technical challenges. One such challenge with ultrafast ultrasound imaging techniques is their unsatisfying resolution due to insufficient compounding angles to synthesize transmit focus. Another such challenge with ultrafast ultrasound imaging techniques is their low SNR when imaging deep regions. Still another challenge with ultrafast ultrasound imaging techniques is the degraded image quality from clutter noises due to secondary lobes, phase aberration, and reverberation caused by tissue inhomogeneities.

Multiplane wave ("MW") compounding has been proposed to increase image SNR without sacrificing spatial resolution or frame rate. In MW imaging, during each single transmission event (i.e., each pulse-echo event), multiple plane waves are emitted quasi-simultaneously with short interleaved time (e.g., a few microseconds). Each plane wave is coded with a "+1" or "−1" multiplicative factor using a Hadamard matrix. Afterwards, the received radio frequency ("RF") signals are decoded through addition or subtraction to recover the signals. The recovered signals are then beamformed and compounded following standard coherent compounding plane wave imaging techniques to provide improved image SNR. One disadvantage of MW imaging, however, is that it suffers strong clutter noises, such as reverberation in B-mode images, due to the long transmission pulses. These clutter noises result in degraded images.

Harmonic imaging ("HI") is an approach to reduce image artifacts and clutter noises, where the images are generated by transmitting at a fundamental frequency and signals are received at harmonic components (mainly at the second harmonic) with filtering or pulse inversion techniques. The harmonic components develop gradually with depth through nonlinear propagation of ultrasound signals and are generally produced by strong echoes. Weak echoes from side lobes, grating lobes, and multipath scattering are, therefore, automatically suppressed. Moreover, harmonics greatly decrease body wall reverberation artifacts because the harmonic components are not generated in the very near field and, thus, pass the body wall only one time. These properties lead to improved image qualities, such as better spatial resolutions due to higher imaging frequency and better contrast-to-noise-ratio ("CNR") because of clutter reduction. Therefore, HI has been widely used in various imaging techniques, such as synthetic aperture imaging, shear wave imaging, and diverge beam compounding.

However, one limitation of HI is its low SNR and penetration depth caused by the low harmonic-to-fundamental ratio and frequency dependent attenuation (i.e., high frequency harmonics are more attenuated compared to fundamental signals).

It would be beneficial to combine HI with MW imaging to retain all the benefits brought by HI and also increase the SNR of harmonic signals via MW encoding. However, the challenge with such a combination is that the ±1 coding factors in Hadamard matrix cannot be used to encode the 2nd harmonic as in MW imaging. This is because the pulse inversion used in MW can only revert the polarity of fundamental signals, whereas the sign of the 2nd harmonic remains the same and thus cannot be encoded with pulse inversion.

Thus, there remains a need to provide harmonic imaging techniques with improved SNR and depth penetration without losing the higher spatial resolution and image quality attainable with harmonic imaging.

SUMMARY OF THE DISCLOSURE

It is an aspect of the present disclosure to provide a method for delay-encoded harmonic imaging with an ultrasound system. A time delay that is a proportional to a period associated with a fundamental frequency of an ultrasound transducer of the ultrasound system is selected. A coding matrix is then formed with a computer system based on the selected delay time. The coding matrix has entries that define whether the time delay will be applied to a given ultrasound emission in a given transmission event. Coded signal data are acquired from a subject with the ultrasound system by transmitting multiple ultrasound emissions spaced apart in time by a time interval to the subject and receiving coded ultrasound signals in response thereto in each of a plurality of different transmission events. The multiple ultrasound emissions are temporally coded by applying the time delay to select ones of the multiple ultrasound emissions according to the coding matrix. The coded signal data are decoded with the computer system using an inverse of the coding matrix, and an image of the subject is produced from the decoded signal data using the computer system.

It is another aspect of the present disclosure to provide an ultrasound system that includes a transducer, a memory, and a controller. The memory includes stored instructions that define a pulse timing sequence that includes a plurality of transmission events, wherein each transmission event includes a plurality of ultrasound emissions that are spaced apart in time by a time interval. The pulse timing sequence also includes a coding matrix whose entries define select ones of the plurality of ultrasound emissions in select ones of the plurality of transmission events to which an additional time delay is applied. The controller is in communication with the transducer and the memory, and is operable to control the transducer to generate ultrasound emissions and receive ultrasound data in response thereto according to the pulse timing sequence stored on the memory.

The foregoing and other aspects and advantages of the present disclosure will appear from the following description. In the description, reference is made to the accompanying drawings that form a part hereof, and in which there is shown by way of illustration a preferred embodiment. This embodiment does not necessarily represent the full scope of the invention, however, and reference is therefore made to the claims and herein for interpreting the scope of the invention.

DETAILED DESCRIPTION

Described here are systems and methods for ultrasound imaging using a delay-encoded harmonic imaging ("DE-HI") technique, in which a multiplane wave ("MW") sequence is coded using temporal delays between emissions within a single transmission event. This coded scheme allows for harmonic imaging to be implemented. The temporal time delay codes are applied temporally to multiple different plane waves within a single transmission event, rather than spatially across different transmitting elements. The received radio frequency ("RF") signals undergo a decoding process in the frequency domain to recover the signals, as they would be obtained from standard single plane wave emissions, for subsequent compounding. As one specific example, a one-quarter period time delay can be used to encode the 2nd harmonic signals from each angle emission during a single MW transmission event, rather than inverting the polarity of the pulses as in conventional MW imaging. However, other time delays can be used as a coding factor, as will be described below in more detail.

The contrast-to-noise ratio ("CNR") and lesion signal-to-noise ratio ("SNR") attainable with the DE-HI techniques described in the present disclosure are significantly improved compared to conventional plane wave compounding. These CNR and SNR improvements are due to the increase in transmitting power attainable by using delay-encoded multiple plane waves rather than a single plane wave emission, and also due to reduced clutter noises resulting from the use of harmonic imaging. The spatial resolutions attainable with the DE-HI techniques described in the present disclosure are also enhanced compared to fundamental frequency-based imaging (e.g., plane wave compounding, MW imaging).

Figure 1:
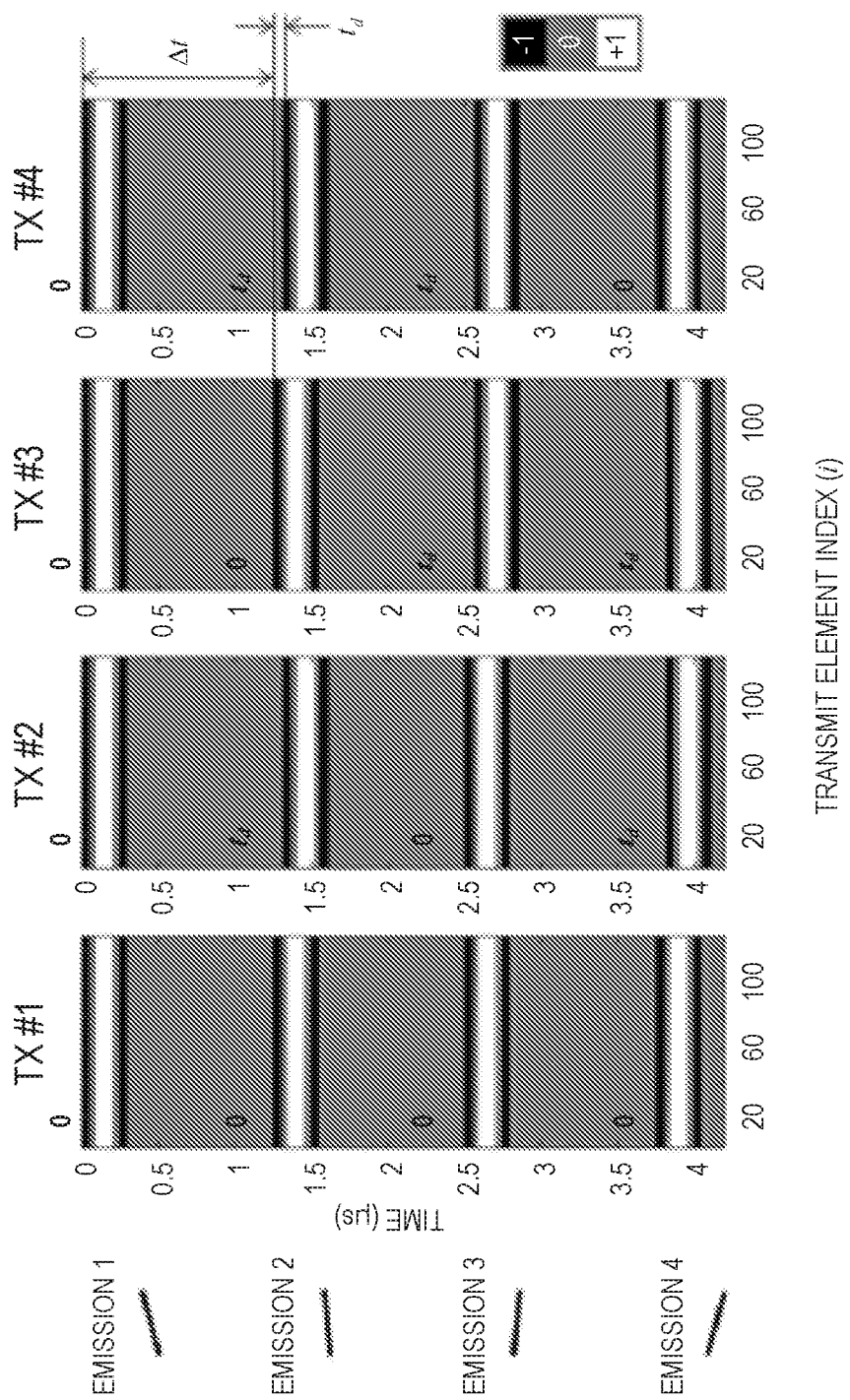
FIG. 1 depicts an example pulse sequence in which four plane wave emissions are generated in each of four different transmission events, and in which select ones of the plane wave emissions are temporally encoded using a delay time, $t_d$, in select ones of the transmission events according to a coding matrix.

An example of a DE-HI transmission scheme is illustrated in FIG. 1. In this example, a multiplane wave sequence that includes four angle emissions has been delay-encoded using a temporal delay coding factor, $t_d$. Four transmission events (i.e., TX #1-4) are excited using the same four emissions (i.e., Emissions 1-4). The emissions are successively activated with the same interleaved time interval, $\Delta t$, between successive emissions, and each emission is preferably angled at a different angle relative to the surface of the ultrasound transducer. As one example, the time interval, $\Delta t$, can be on the order of a few microseconds. As another, the time interval, $\Delta t$, can be zero. In any instance, the transmission scheme is coded using a time delay, $t_d$, such that different emissions in a single transmission event can be coded using the coding factors $[0,t_d]$, where 0 represents no time delay being added to the current emission and $t_d$ represents the time delay, $t_d$, being applied. For 2nd harmonic encoding, the time delay, $t_d$, is preferably set to one-quarter of the period at the central frequency, of the transmitted pulse, $$t_d = \frac{T}{4} = \frac{1}{4f_0}. \qquad (1)$$

In each transmission event, selected emissions are delayed by the time delay, $t_d$. For example, in the second transmission event (TX #2) in FIG. 1, emissions 2 and 4 are delayed by the time delay, $t_d$. By setting the delay time to one-quarter of the period at the central frequency, $f_0$, it is equivalent to delaying the second harmonic component by a one-half period calculated at the second harmonic frequency, $2f_0$, which leads to a rough approximation of its inversion. The time delay, $t_d$, can be a positive or negative number, provided that $\Delta t + t_d > 0$.

The time delays, $t_d$, can be coded using any suitable encoding scheme. As one particular example, the time delays can be coded using a coding matrix, such as a Hadamard coding matrix. In these examples, the "−1" Hadamard coding factors can be replaced with the time delay and the "+1" Hadamard coding factors can be replaced with no time delay.

When multiple plane waves are excited quasi-simultaneously as described here, the measured RF signals will equal the summation of the signals received when each plane wave was transmitted individually, $$\sum_{i=1}^{I} p_i(t - t_d(i)) = m_l(t); \qquad (2)$$

where $p_i(t)$ is the RF signal received in the $i^{th}$ ($i=1, 2, \ldots, I$) single plane wave emission, which includes the fixed time interval, $\Delta t$; $t_d(i)$ is the delay time applied for encoding in the $i^{th}$ single plane wave emission; and $m_l(t)$ is the RF signal measured in the $l^{th}$ ($l=1, 2, \ldots, L$) transmission event in DE-HI sequence when I emissions are fired quasi-simultaneously. When there is one-quarter period delay added to the $i^{th}$ emission, $$t_d(i) = \frac{1}{4f_0};  \quad (3)$$

otherwise, $t_d(i)$ is zero.

According to the translation properties of Fourier transform ("FT"), encoding the $i^{th}$ plane wave emission, $p_i(t)$, with a time delay, $t_d(i)$, is equivalent to multiplying the signal spectrum, $P_i(f)$, by a coding factor, $$A_i = e^{-j2\pi f t_d(i)} \quad (4);$$

in the frequency domain, which yields, $$p_i(t - t_d(i)) \xleftrightarrow{FT} \sum_{i=1}^{I} P_i(f) e^{-j2\pi f t_d(i)} = M_l(f). \quad (5)$$

Then, in each transmission event, $$\sum_{i=1}^{I} p_i(t - t_d(i)) = m_l(t) \xleftrightarrow{FT} \sum_{i=1}^{I} P_i(f) e^{-j2\pi f t_d(i)} = M_l(f); \quad (6)$$

where $M_l(f)$ is the spectrum of $m_l(t)$. Eqn. (6) can also be written in vector format as, $$AP = M \quad (7);$$

where A, P, and M are matrices with elements of $A_i(f)$, $P_i(f)$ and $M_l(f)$, respectively. The coding matrix, A, can be calculated by keeping all the "+1" elements in the Hadamard matrix when there is no delay and replacing all of the "−1" elements in the Hadamard matrix with the coding factor, $$A_i(f) = e^{-j2\pi f t_d(i)} = e^{-j\pi \frac{f}{2f_0}}; \quad (8)$$

when the delay time, $t_d(i)$, is set as a one-quarter period delay, as in Eqn. (3). Here, f is an arbitrary frequency within the decoding bandwidth. The entries in the coding matrix, $A_i(f)$, depend on frequency, f. Eqn. (7) can be expanded based on the transmission scheme shown in FIG. 1 (which includes four transmission events, each with four emissions coded with a 4th order delay coding matrix, I=L=4) as, $$\begin{bmatrix} 1 & 1 & 1 & 1 \\ 1 & e^{-j\pi \frac{f}{2f_0}} & 1 & e^{-j\pi \frac{f}{2f_0}} \\ 1 & 1 & e^{-j\pi \frac{f}{2f_0}} & e^{-j\pi \frac{f}{2f_0}} \\ 1 & e^{-j\pi \frac{f}{2f_0}} & e^{-j\pi \frac{f}{2f_0}} & 1 \end{bmatrix} \begin{bmatrix} P_1(f) \\ P_2(f) \\ P_3(f) \\ P_4(f) \end{bmatrix} = \begin{bmatrix} M_1(f) \\ M_2(f) \\ M_3(f) \\ M_4(f) \end{bmatrix}. \quad (9)$$

To recover P (i.e., equivalent data spectrum as would be acquired with single plane wave emission), a decoding matrix, D, for each frequency within the decoding bandwidth can be multiplied to both sides of Eqn. (7) to yield, $$P = DM \quad (10).$$

In principle, $D = A^{-1}$. After obtaining the P matrix, an inverse Fourier transform is applied to the matrix to transform the $P_i(f)$ spectra and yield $p_i(t)$, which are essentially equivalent to the temporal 2nd harmonic signals from each angle emission individually, as in standard plane wave compounding. After decoding, the interleaved time, $\Delta t$, is compensated by shifting the decoded RF data axially by the appropriate time. The decoded and re-aligned temporal RF signals, $p_i(t)$, then undergo beamforming and compounding to form the final DE-HI image.

Figure 2:
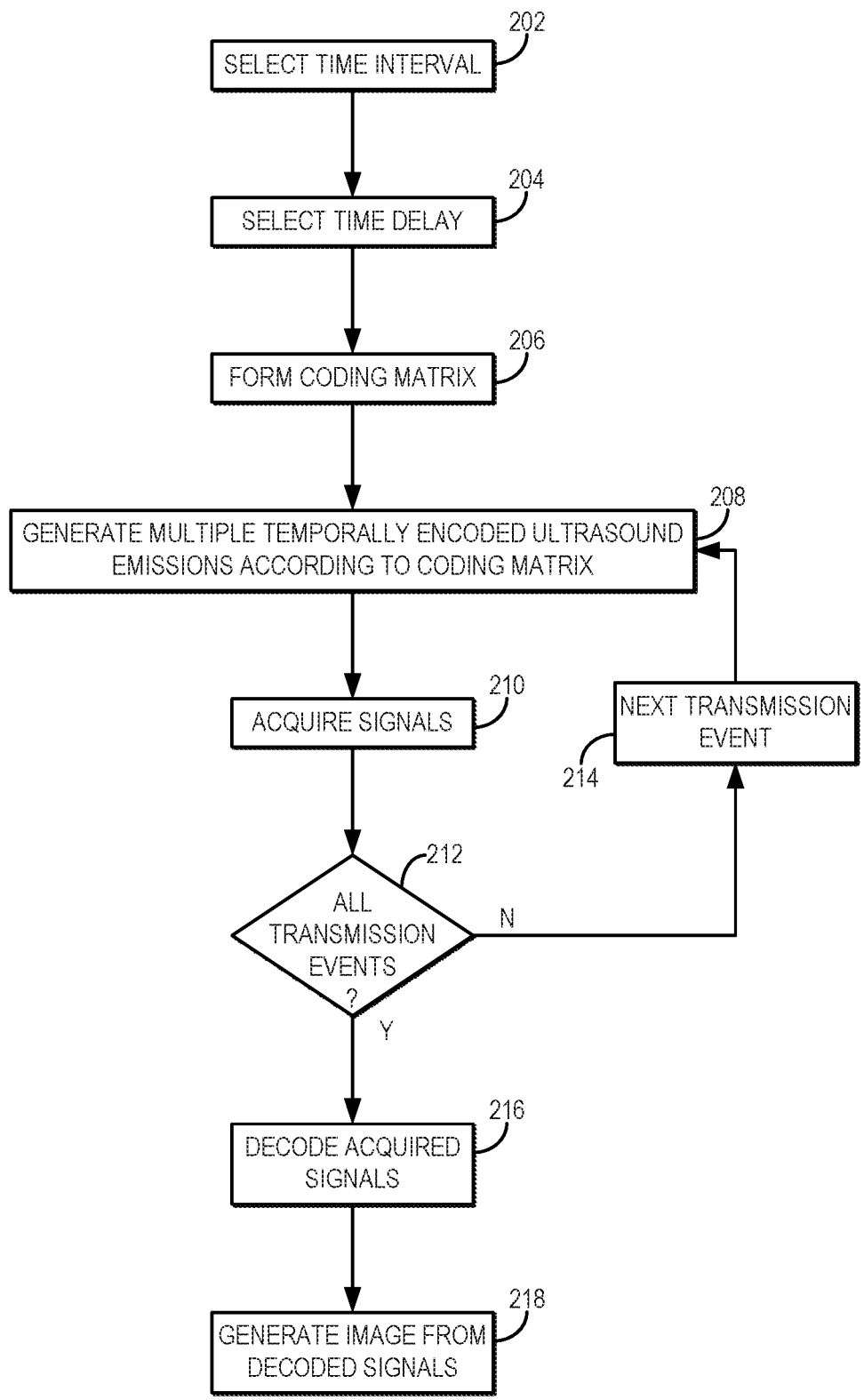
FIG. 2 is a flowchart setting forth the steps of an example method for implementing delay-encoded harmonic imaging with an ultrasound system.

Referring now to FIG. 2, a flowchart is illustrated as setting forth the steps of an example method for delay-encoded harmonic imaging ("DE-HI") with an ultrasound system. The method includes initializing the parameters to be used in a delay-encoded harmonic imaging pulse sequence. As indicated in step 202, a time interval, $\Delta t$, that temporally separates successive ultrasound emissions in a single transmission event is selected. Preferably, the same time interval is used within in each transmission event and across transmission events. The ultrasound emissions may be plane wave emissions, as described above, but other ultrasound emissions can also be used, such as those used in line-by-line scanning, wide beam scanning, or Doppler ultrasound techniques. Similarly, although the examples described here use pulse-echo ultrasound, it will be appreciated by those skilled in the art that the methods described here can also be applied to transmission ultrasound imaging.

As indicated at step 204, a time delay, $t_d$, to be used as a coding factor for temporally encoding the ultrasound emissions in a single transmission event is also selected. In some examples, the time delay, $t_d$, can be selected as one-quarter of the period of the ultrasound emissions at the central frequency, $f_0$. This selection provides second harmonic imaging; thus, it will be appreciated that other time delays can be selected to provide imaging of other harmonics, including subharmonics or ultraharmonics. Preferably, the same time delay is used within in each transmission event and across transmission events; however, it may also be possible to use more than one time delay such that different encoding is achieved within a transmission event, across transmission events, or both.

A coding matrix is then formed using the selected time delay, $t_d$, as indicated at step 206. As described above, the coding matrix includes coding factors based on the selected time delay. For instance, the coding factors can include "1" when no time delay is to be used, and can include $A_i = e^{-j2\pi f t_d(i)}$ when a time delay is used. In the examples where multiple different time delays are selected, the coding matrix can be formed to have multiple different coding factors based on the different time delays. In some examples, the coding matrix can be constructed as a Hadamard matrix in which the "−1" entries are replaced with the time delay-based coding factors. In other example, other coding matrices can be used and adapted using the time-delay based coding factors.

Imaging then proceeds using the coding matrix and the selected time interval to generate multiple pulse sequences for one or more different transmission events. Multiple different ultrasound emissions are generated, as indicated at step 208. The ultrasound emissions are spaced apart in time by the time interval, $\Delta t$, and additionally by any time delay, $t_d$, applied through the coding matrix for a given emission. Signals are then acquired in response to the ultrasound emissions, as indicated at step 210.

A determination is then made at decision block 212 whether the desired number of transmission events have been performed. If not, then the next transmission event is selected at step 214 and the corresponding entries in the coding matrix are used to generated the next series of temporally encoded ultrasound emissions at step 208 to acquire the next set of signals at step 210. When all of the transmission events have been performed, the acquired signals are decoded, as indicated at step 216. The coding matrix is used to perform this decoding, such as by inverting the coding matrix and applying the inverted coding matrix to the acquired signals. From the decoded signals, one or more images can be produced, as indicated at step 218. For instance, images can be produced using conventional beamforming and compounding techniques.

In some embodiments, additional steps can be taken to remove signals corresponding to the fundamental frequency. Typically, harmonic signals can be generated by either filtering out the signals at the fundamental frequency or using pulse inversion to cancel the fundamental frequency signals. Because a narrow filter worsens axial resolution, especially when overlap exists between the fundamental and second harmonic bandwidths, pulse inversion is preferable.

Figure 3:
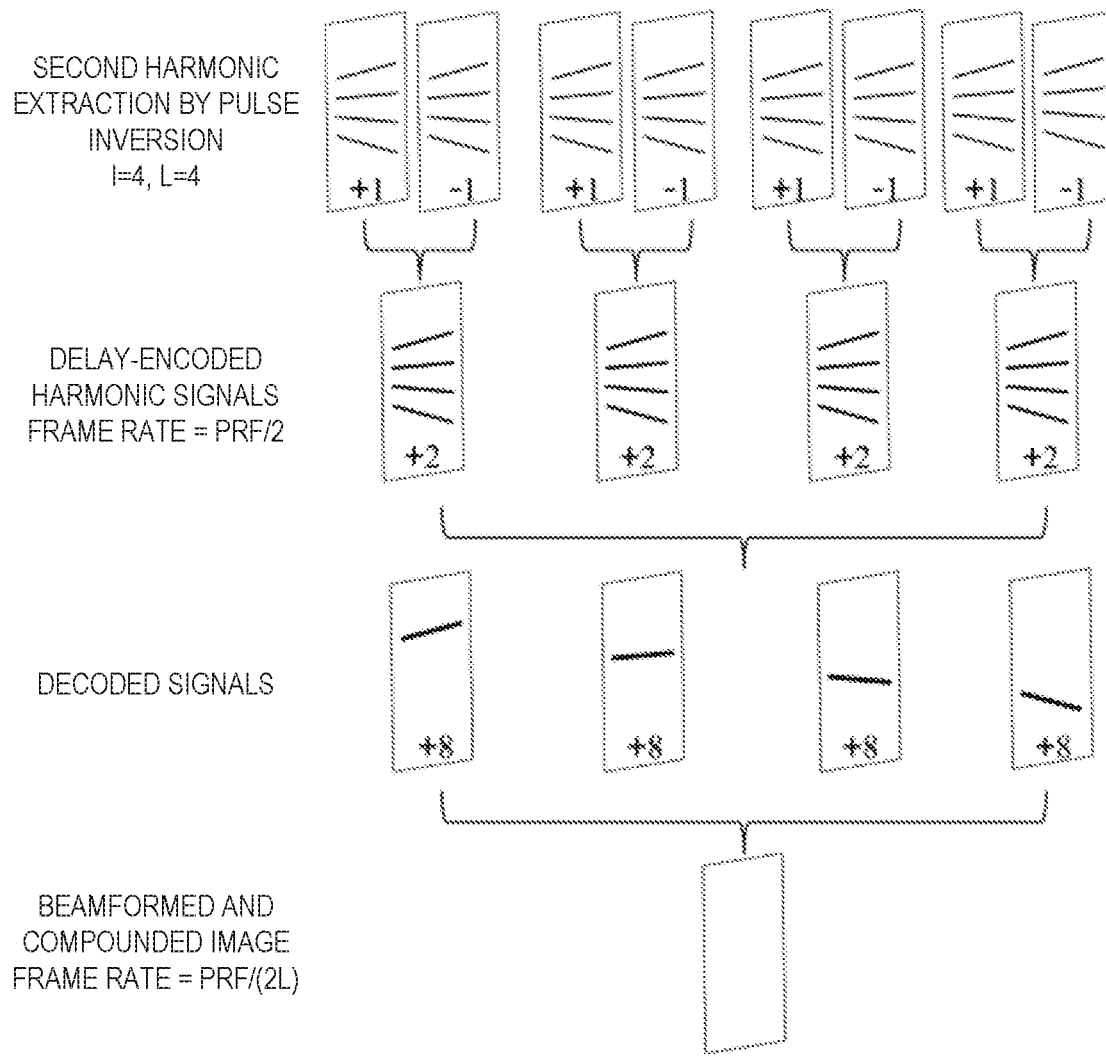
FIG. 3 illustrates a delay-encoded harmonic imaging scheme in which pulse inversion is used to reduce contributions from signals at the fundamental frequency.

FIG. 3 shows an example DE-HI sequence using pulse inversion to remove the fundamental frequency signal. Four compounding angles are used (L=4; I=4) in this example. In this example, pulse inversion is performed by exciting a pair of identical transmission events with opposite polarities sequentially in time. Each transmission of the pair contains four angle emissions coded with the same delays (including both $\Delta t$ and $t_d$). Then, the fundamental and odd harmonic components are cancelled after the summation of the each positive-negative pair of transmission events, resulting in delay-encoded second harmonic signals. Using this pulse inversion scheme, the amplitude of the second harmonic is doubled. Afterwards, the decoding process as described above is applied to the received RF signals to obtain equivalent harmonic signals as would be obtained in conventional plane wave imaging, but with much higher amplitudes. The decoded signals from all angle emissions are then beamformed and summed coherently to form the final compounded image.

Figure 4:
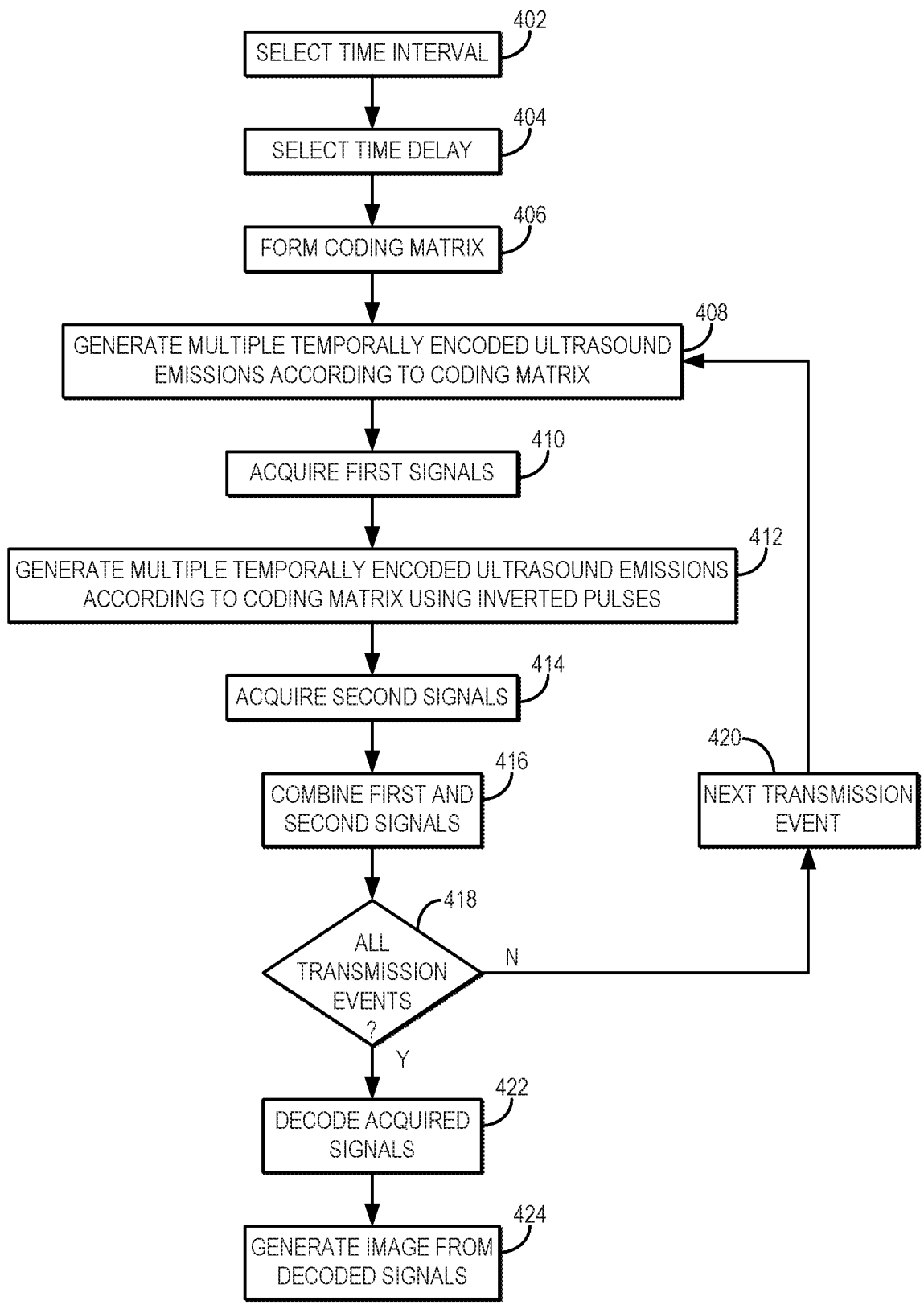
FIG. 4 is a flowchart setting forth the steps of an example method for implementing delay-encoded harmonic imaging with an ultrasound system, in which pulse inversion is used within each transmission event to reduce contributions from the fundamental frequency.

Referring now to FIG. 4, a flowchart is illustrated as setting forth the steps of an example method for DE-HI using an ultrasound system, and in which signals from the fundamental frequency are cancelled using pulse inversion. The method includes initializing the parameters to be used in a delay-encoded harmonic imaging pulse sequence. As indicated in step 402, a time interval, $\Delta t$, that temporally separates successive ultrasound emissions in a single transmission event is selected. Preferably, the same time interval is used within in each transmission event and across transmission events. The ultrasound emissions may be plane wave emissions, as described above, but other ultrasound emissions can also be used, such as those used in line-by-line scanning, wide beam scanning, or Doppler ultrasound techniques. Similarly, although the examples described here use pulse-echo ultrasound, it will be appreciated by those skilled in the art that the methods described here can also be applied to transmission ultrasound imaging.

As indicated at step 404, a time delay, $t_d$, to be used as a coding factor for temporally encoding the ultrasound emissions in a single transmission event is also selected. In some examples, the time delay, $t_d$, can be selected as one-quarter of the period of the ultrasound emissions at the central frequency, $f_0$. This selection provides second harmonic imaging; thus, it will be appreciated that other time delays can be selected to provide imaging of other harmonics, including subharmonics or ultraharmonics. Preferably, the same time delay is used within in each transmission event and across transmission events; however, it may also be possible to use more than one time delay such that different encoding is achieved within a transmission event, across transmission events, or both.

A coding matrix is then formed using the selected time delay, $t_d$, as indicated at step 406. As described above, the coding matrix includes coding factors based on the selected time delay. For instance, the coding factors can include "1" when no time delay is to be used, and can include $A_i = e^{-j2\pi f t_d(i)}$ when a time delay is used. In the examples where multiple different time delays are selected, the coding matrix can be formed to have multiple different coding factors based on the different time delays. In some examples, the coding matrix can be constructed as a Hadamard matrix in which the "−1" entries are replaced with the time delay-based coding factors. In other example, other coding matrices can be used and adapted using the time-delay based coding factors.

Imaging then proceeds using the coding matrix and the selected time interval to generate multiple pulse sequences for one or more different transmission events. Multiple different ultrasound emissions are generated, as indicated at step 408. The ultrasound emissions are spaced apart in time by the time interval, $\Delta t$, and additionally by any time delay, $t_d$, applied through the coding matrix for a given emission. First signals are then acquired in response to the ultrasound emissions, as indicated at step 410.

The pulses used to generate the ultrasound emissions in step 408 are then inverted and a second set of ultrasound emissions are generated according to the same temporal encoding scheme used in step 408. Second signals are then acquired in response to these ultrasound emissions, as indicated at step 414. The first and second signals are then combined, as indicated at step 416, to cancel the signal occurring at the fundamental frequency while retaining, and amplifying, the harmonic signals.

A determination is then made at decision block 418 whether the desired number of transmission events have been performed. If not, then the next transmission event is selected at step 420 and the corresponding entries in the coding matrix are used to generated the next series of temporally encoded ultrasound emissions at step 408 to acquire the next set of first signals at step 410, and to generate the next series of pulse inverted, temporally encoded ultrasound emissions at step 412 to acquire the next set of second signals at step 414. These first and second signals are then combined at step 416 as was done for the previous transmission event. When all of the transmission events have been performed, the acquired signals are decoded, as indicated at step 422. The coding matrix is used to perform this decoding, such as by inverting the coding matrix and applying the inverted coding matrix to the acquired signals. From the decoded signals, one or more images can be produced, as indicated at step 424. For instance, images can be produced using conventional beamforming and compounding techniques.

The frame rate using this pulse inversion implementation of DE-HI will be reduced in half as compared to conventional plane wave compounding because of the use of pulse inversion. In other implementations, a sliding-window pulse inversion technique can be used to preserve the frame rate, such as the sliding-window technique described by M. Correia, et al., in "Ultrafast Harmonic Coherent Compound (UHCC) Imaging for High Frame Rate Echocardiography and Shear-Wave Elastography," *IEEE Transactions on Ultrasonics Ferroelectrics and Frequency Control,* 2016; 63:420-431.

An example imaging sequence using the methods described here is now provided. An ultrasound system with a linear array transducer was used in this example. The transmit center frequency was 4 MHz and the second harmonic was 8 MHz. The decoding process was performed within the bandwidth of 4-12 MHz. The received channel data were sampled at 32 MHz. Sixteen emission angles were used for compounding, ranging from −7.5 degrees to 7.5 degrees at an interval of 1 degree. The sixteen angle emissions were evenly divided into two groups, each group with eight angles for encoding. This was conducted for a shorter transmitting pulse in each transmission event and therefore, a smaller near field dead zone compared to sixteen angles encoding. A one-quarter period time delay was used.

Using this example imaging sequence, a phantom (Model 040GSE, CIRS Inc., Norfolk, Va.) was imaged using plane wave imaging, multiplane wave imaging, harmonic imaging, and the DE-HI technique described here. A 1 cm thick pork belly was positioned between the ultrasound transducer and the phantom to simulate subcutaneous tissue that would generate clutter noise. FIGS. 5A-5D show B-mode images of this phantom using these different imaging techniques.

Fundamental images (FIGS. 5A and 5B) suffered from reverberation artifacts from the pork belly, leading to clutters. These clutters are more severe in MW image (FIG. 5B) compared to the standard plane wave image due to the longer transmitting pulses, resulting in degraded CNR and lesion SNR values. The reverberation artifacts were greatly decreased in harmonic images (FIGS. 5C and 5D), as shown in the 10-20 mm depth regions in FIGS. 5C and 5D. As expected, harmonic images provided improved CNR and lesion SNR values. This enhancement was more significant for DE-HI in FIG. 5D as compared to traditional harmonic imaging in FIG. 5C because of the increased SNR in the RF data resulting from the DE-HI encoding. Another improvement in the harmonic images (FIGS. 5C and 5D) over the plane wave and MW images (FIGS. 5A and 5B) is the spatial resolution, resulting from the second harmonic signal, which has doubled ultrasound frequency.

Figure 5:
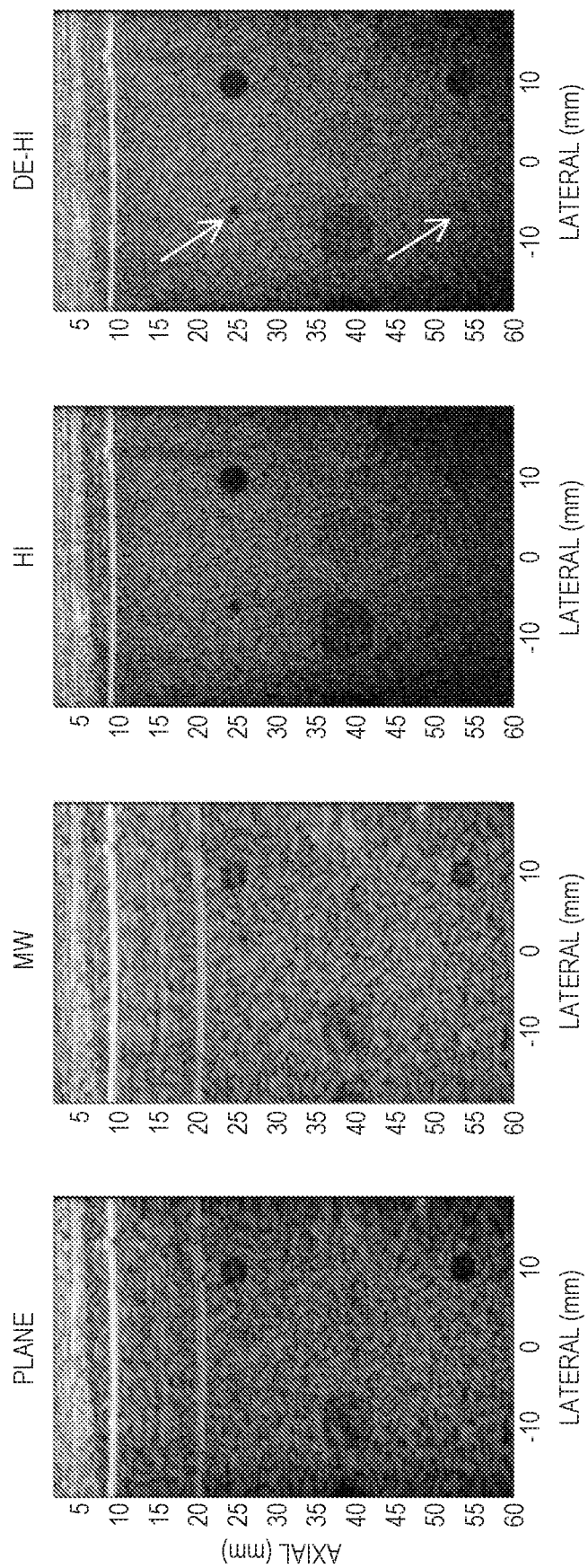
FIG. 5A is an example image of a phantom acquired using plane wave imaging.
FIG. 5B is an example image of a phantom acquired using multiplane wave imaging.
FIG. 5C is an example image of a phantom acquired using harmonic imaging.
FIG. 5D is an example image of a phantom acquired using an example of delay-encoded harmonic imaging as described in the present disclosure.

As one example of the overall imaging improvement conferred by the DE-HI technique, the small inclusions as pointed by the white arrows in FIG. 5D can be observed in the DE-HI image, but are invisible in either FIG. 5A or FIG. 5B when imaging with fundamental signals. This was a combined effect of reverberation reduction and better resolution with harmonic imaging. The lower small inclusion (at around 55 mm depth) was better identified in FIG. 5D compared to conventional harmonic imaging in FIG. 5C as a result of the increased SNR in the DE-HI sequence.

Figure 6:
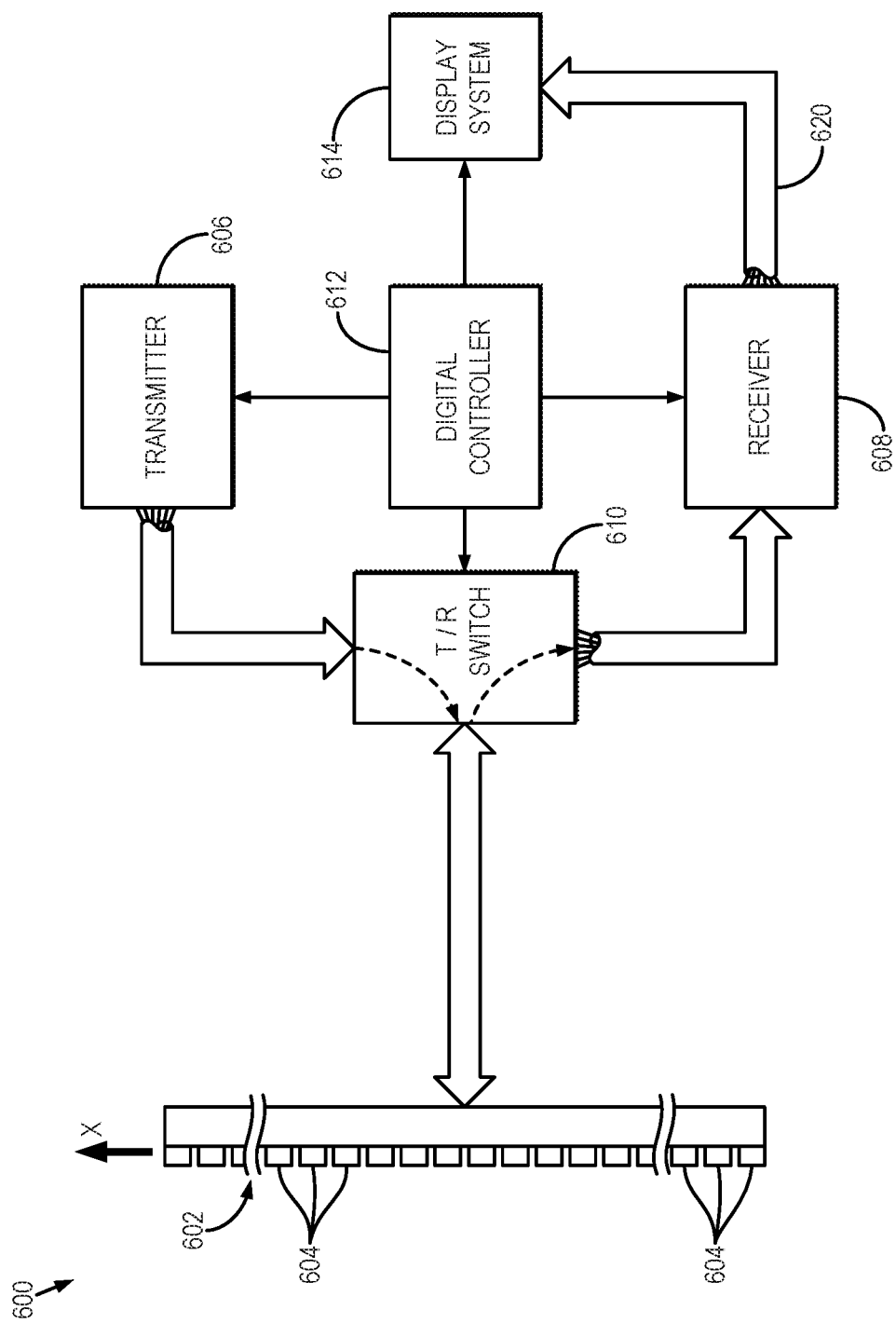
FIG. 6 is a block diagram of an example ultrasound system that can implement the delay-encoded harmonic imaging techniques described in the present disclosure.

FIG. 6 illustrates an example of an ultrasound system 600 that can implement the delay-encoded harmonic imaging ("DE-HI") techniques described here. The ultrasound system 600 includes a transducer array 602 that includes a plurality of separately driven transducer elements 604. The transducer array 602 can include any suitable ultrasound transducer array, including linear arrays, curved arrays, phased arrays, and so on. When energized by a transmitter 606, each transducer element 602 produces a burst of ultrasonic energy. The ultrasonic energy reflected back to the transducer array 602 from the object or subject under study is converted to an electrical signal by each transducer element 604 and applied separately to a receiver 608 through a set of switches 610. The transmitter 606, receiver 608, and switches 610 are operated under the control of a controller 612, which may include one or more processors. As one example, the controller 612 can include a computer system.

The controller 612 can be programmed to design an imaging sequence using the techniques described above. In some embodiments, the controller 612 receives user inputs defining various factors used in the design of the imaging sequence, which may include the number of transmission events to perform; the number of ultrasound emissions to generate in each transmission event; the time interval, $\Delta_t$, to wait between successive ultrasound emissions in a given transmission event; and the additional time delays, $t_d$, to use to temporally encode ultrasound emissions in a given transmission event.

A complete scan is performed by acquiring a series of echo signals in which the switches 610 are set to their transmit position, thereby directing the transmitter 606 to be turned on momentarily to energize each transducer element 604 during a single transmission event according to the designed imaging sequence. The switches 610 are then set to their receive position and the subsequent echo signals produced by each transducer element 604 are measured and applied to the receiver 608. The separate echo signals from each transducer element 604 can be combined in the receiver 608 to produce a single echo signal. As mentioned above, the acquired signals can be decoded using an inverse of a coding matrix used to code the multiple ultrasound emissions within and across transmission events in the imaging sequence. Images produced from the decoded signals can be displayed on a display system 614

The transmitter 606 drives the transducer array 602 according to the imaging sequence such that multiple ultrasound emissions are generated quasi-simultaneously according to the selected time interval and the time delays coded in the coding matrix.

The present disclosure has described one or more preferred embodiments, and it should be appreciated that many equivalents, alternatives, variations, and modifications, aside from those expressly stated, are possible and within the scope of the invention.

The invention claimed is:

1. A method for delay-encoded harmonic imaging with an ultrasound system, the steps of the method comprising:
    (a) selecting a time delay that is a proportional to a period associated with a fundamental frequency of an ultrasound transducer of the ultrasound system;
    (b) forming a coding matrix with a computer system based on the selected delay time, wherein the coding matrix has entries that define whether the time delay will be applied to a given ultrasound emission in a given transmission event;
    (c) acquiring coded signal data from a subject with the ultrasound system by transmitting multiple ultrasound emissions spaced apart in time by a time interval to the subject and receiving coded ultrasound signals in response thereto in each of a plurality of different transmission events, wherein the multiple ultrasound emissions are temporally coded by applying the time delay to select ones of the multiple ultrasound emissions according to the coding matrix;
    (d) decoding the coded signal data with the computer system using an inverse of the coding matrix; and
    (e) producing an image of the subject from the decoded signal data using the computer system.

2. The method as recited in claim 1, wherein the coding matrix is a modified Hadamard coding matrix in which values of +1 are replaced with a zero time delay value and values of −1 are replaced with the selected time delay.

3. The method as recited in claim 2, wherein the coded signal data acquired in step (c) are frequency domain data and step (d) includes converting the coding matrix to a frequency domain to decode the coded signal data in the frequency domain.

4. The method as recited in claim 3, wherein step (e) includes applying a Fourier transform to the decoded signal data and producing the image from the Fourier transformed decoded signal data.

5. The method as recited in claim 1, wherein the coding matrix is a frequency domain coding matrix formed by modifying a Hadamard coding matrix such that values of −1 are replaced with an exponential coding factor associated with a Fourier shift of the time delay.

6. The method as recited in claim 1, wherein the time delay is selected as one quarter of the period associated with the fundamental frequency such that second harmonics will be present in the coded signal data.

7. The method as recited in claim 1, wherein:
the coded signal data acquired in step (c) include first coded signal data and second coded signal data, wherein the first coded signal data and the second coded signal data are acquired in each transmission event, the second coded signal data being acquired after transmitting ultrasound emissions whose transmit pulse profile is inverted relative to the ultrasound emissions transmitted to acquire the first coded signal data; and
step (d) includes combining the first and second coded signal data before decoding the coded signal data such that signals associated with the fundamental frequency are reduced.

8. The method as recited in claim 1, wherein step (e) includes computing temporal domain data by applying an inverse Fourier transform to the decoded signal data and producing the image from the temporal domain data.

9. The method as recited in claim 8, wherein step (e) further includes producing shifted temporal domain data by applying time shifts to the temporal domain data to compensate for the time interval between the multiple ultrasound emissions.

10. The method as recited in claim 9, wherein step (e) includes producing the image by beamforming and compounding the shifted temporal domain data.

11. The method as recited in claim 1, wherein the ultrasound emissions are plane wave emissions.

12. The method as recited in claim 1, wherein the time interval is zero.

13. The method as recited in claim 1, wherein the coded signal data are acquired using one of pulse-echo ultrasound or transmission ultrasound imaging.

14. An ultrasound system, comprising:
a transducer;
a memory having stored thereon instructions that define a pulse timing sequence comprising:
a plurality of transmission events, wherein each transmission event includes a plurality of ultrasound emissions that are spaced apart in time by a time interval;
a coding matrix whose entries define select ones of the plurality of ultrasound emissions in select ones of the plurality of transmission events to which an additional time delay is applied; and
a controller in communication with the transducer and the memory, the controller being operable to control the transducer to generate ultrasound emissions and receive ultrasound data in response thereto according to the pulse timing sequence stored on the memory.

15. The ultrasound system as recited in claim 14, further comprising a processor in communication with the transducer to receive the ultrasound data therefrom, the processor being configured to decode the received ultrasound data using an inverse of the coding matrix and to produce an image from the decoded ultrasound echo data.

16. The ultrasound system as recited in claim 14, wherein the additional time delay is proportional to a period of a fundamental frequency at which the ultrasound transducer generates the ultrasound emissions.

17. The ultrasound system as recited in claim 16, wherein the additional time delay is one quarter of the period of the fundamental frequency at which the ultrasound transducer generates the ultrasound emissions.

18. The ultrasound system as recited in claim 14, wherein the coding matrix is a modified Hadamard coding matrix in which values of +1 are replaced with a zero time delay value and values of −1 are replaced with the additional time delay.

19. The ultrasound system as recited in claim 14, wherein the controller is operable to control the transducer to generate the ultrasound emissions as plane wave emissions.

20. The ultrasound system as recited in claim 14, wherein the time interval defined in the pulse timing sequence is zero.

* * * * *